US012600418B2

(12) United States Patent
Momii et al.

(10) Patent No.: US 12,600,418 B2
(45) Date of Patent: Apr. 14, 2026

(54) MOVABLE SPOILER DEVICE

(71) Applicant: Honda Motor Co., Ltd., Tokyo (JP)

(72) Inventors: Motoyuki Momii, Tokyo (JP); Kei Ambo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 462 days.

(21) Appl. No.: 18/446,481

(22) Filed: Aug. 9, 2023

(65) Prior Publication Data

US 2024/0109610 A1    Apr. 4, 2024

(30) Foreign Application Priority Data

Sep. 29, 2022    (CN) .......................... 202211198086.4

(51) Int. Cl.
B62D 35/00          (2006.01)
(52) U.S. Cl.
CPC .................................. B62D 35/007 (2013.01)
(58) Field of Classification Search
CPC .. B62D 35/007; B62D 35/005; B62D 35/008; B62D 35/001; B62D 35/002
USPC ............................................ 296/180.1, 180.5
See application file for complete search history.

(56) References Cited

U.S. PATENT DOCUMENTS

| | | | | |
|---|---|---|---|---|
| 2015/0166130 A1* | 6/2015 | Lee | ........................ | B62D 37/02 |
| | | | | 296/180.5 |
| 2022/0289314 A1* | 9/2022 | Nakamura | ............ | B60R 19/483 |

FOREIGN PATENT DOCUMENTS

| | | | | | |
|---|---|---|---|---|---|
| DE | 102017209949 A1 | * | 5/2018 | ............. | B62D 37/02 |
| WO | WO-2019043199 A1 | * | 3/2019 | ............. | B62D 37/02 |

* cited by examiner

*Primary Examiner* — Amy R Weisberg
*Assistant Examiner* — Daniel R Digiovannantonio
(74) *Attorney, Agent, or Firm* — JCIPRNET

(57)          ABSTRACT
A movable spoiler device is provided. The movable spoiler device includes: a fixed part, fixed on a body of a vehicle; a movable part, movable between a storage position and a deployed position; an actuator, disposed on the fixed part and drives the movable part to move in a front-rear direction; a rotating frame, connected to the actuator and rotates synchronously with the actuator; a connecting member, connected to the rotating frame and the movable part; and a locking member, disposed between the actuator and the rotating frame, applies force to the actuator through an elastic member, and is locked on the rotating frame, wherein, when the movable part is in the deployed position and is subjected to a load applied from the rear, the rotating frame is rotated by pushing the locking member against the elastic member to release the fitting of the locking member.

6 Claims, 8 Drawing Sheets

Z

X

52

54

P2
100

110

120

50

MOVABLE SPOILER DEVICE

CROSS-REFERENCE TO RELATED APPLICATION

This application claims the priority benefit of China application serial no. 202211198086.4 filed on Sep. 29, 2022. The entirety of the above-mentioned patent application is hereby incorporated by reference herein and made a part of this specification.

BACKGROUND

Technical Field

The disclosure relates a movable spoiler device.

Description of Related Art

In recent years, due to concerns about global warming, in order to ensure affordable, reliable, sustainable, and advanced energy access for more people, research and development on fuel efficiency improvement that contributes to energy efficiency is underway. However, the aerodynamic performance of the vehicle is an issue in the present technology regarding improvement of fuel efficiency.

In the prior art, generally, a spoiler device may be disposed at the rear end of the body of the vehicle (such as the rear bumper) to improve the aerodynamic performance of the vehicle. A common spoiler device may be a fixed spoiler with a specific shape. At present, there is also a movable spoiler device formed of a fixed part and a movable part. The movable part may move relative to the fixed part in a front-rear direction of the vehicle to change its position, thereby adjusting the aerodynamic performance. However, during the movement of the movable part in the front-rear direction of the vehicle relative to the fixed part by the driving of the link mechanism, when the movable part is subjected to a load applied from the rear to the front of the vehicle, the actuator may be damaged due to the torque generated by the reverse movement of the movable part. Therefore, it is necessary to improve the above structure of the movable spoiler device.

In order to solve the above-mentioned problems, the disclosure aims to achieve a movable spoiler device capable of preventing an actuator from being damaged. Furthermore, it in turn contributes to energy efficiency by operating the aerodynamic device.

SUMMARY

A movable spoiler device, which may prevent an actuator from being damaged, is provided in the disclosure.

A movable spoiler device is provided in the disclosure, including: a fixed part, fixed on a body of a vehicle; a movable part, configured to be movable between a storage position connected to the fixed part and a deployed position protruding from the fixed part toward rear of the vehicle; an actuator, disposed on the fixed part and drives the movable part to move in a front-rear direction of the vehicle; a rotating frame, connected to the actuator and rotates synchronously with the actuator; a connecting member, connected to the rotating frame and the movable part; and a locking member, disposed between the actuator and the rotating frame, applies force to the actuator through an elastic member, and is locked on the rotating frame, wherein, when the movable part is in the deployed position and is subjected to a load applied from the rear to front of the vehicle, the rotating frame is rotated by pushing the locking member against the elastic member to release the fitting of the locking member, and rotates idly relative to the actuator.

Based on the above, in the movable spoiler device of the disclosure, the rotating frame and the actuator rotate synchronously, the connecting member is connected to the rotating frame and the movable part, and the locking member is disposed between the actuator and the rotating frame, applies force to the actuator through the elastic member, and is locked on the rotating frame. When the movable part is in the deployed position and is subjected to a load applied from the rear to front of the vehicle, the rotating frame is rotated by pushing the locking member against the elastic member to release the fitting of the locking member, and rotates idly relative to the actuator. In this way, even if the movable part is pushed in reverse due to the application of an external load during the movement of the movable part relative to the fixed part, the rotating frame that rotates synchronously with the actuator via the fitting of the locking member may also rotate idly relative to the actuator in a state where the fitting of the locking member is released, so that the rotation of the rotating frame does not drive the actuator and cause damage to it. Accordingly, the movable spoiler device of the disclosure may prevent the actuator from being damaged.

In order to make the above-mentioned features and advantages of the disclosure comprehensible, embodiments accompanied with drawings are described in detail below.

DETAILED DESCRIPTION OF DISCLOSED EMBODIMENTS

Figure 1A:
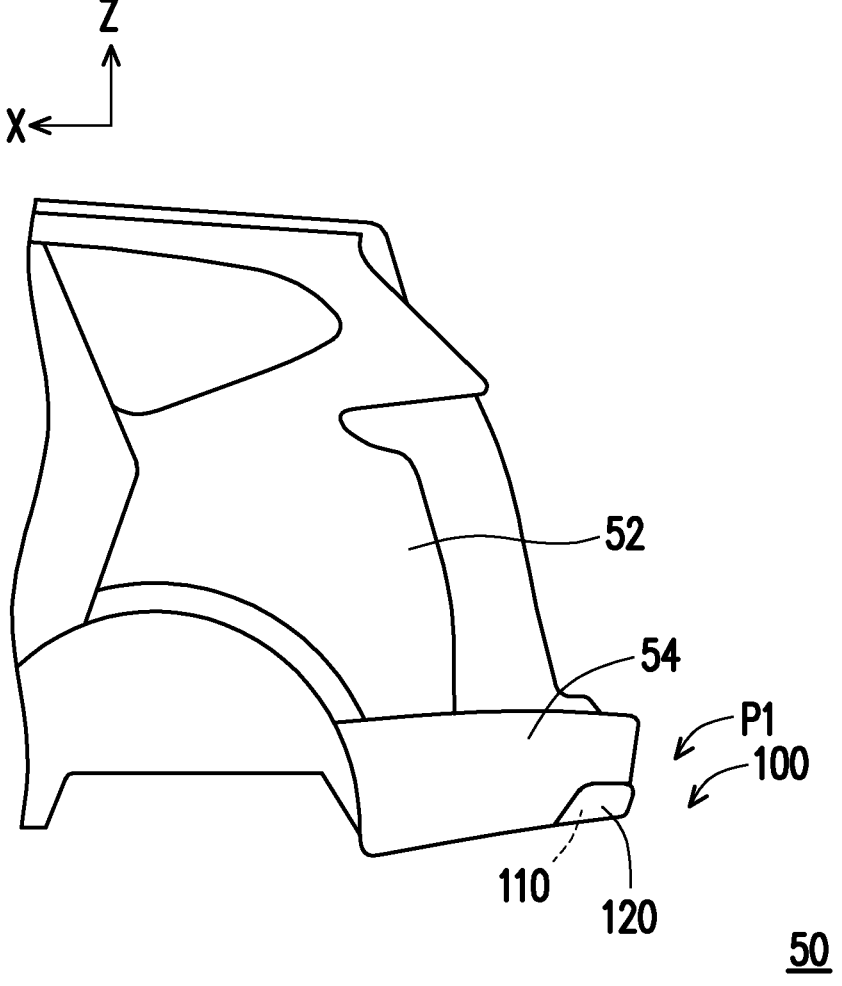
FIG. 1A and FIG. 1B are schematic diagrams of a movable spoiler device in an embodiment of the disclosure applied on a vehicle and is located in a storage position and a deployed position.
Figure 1B:
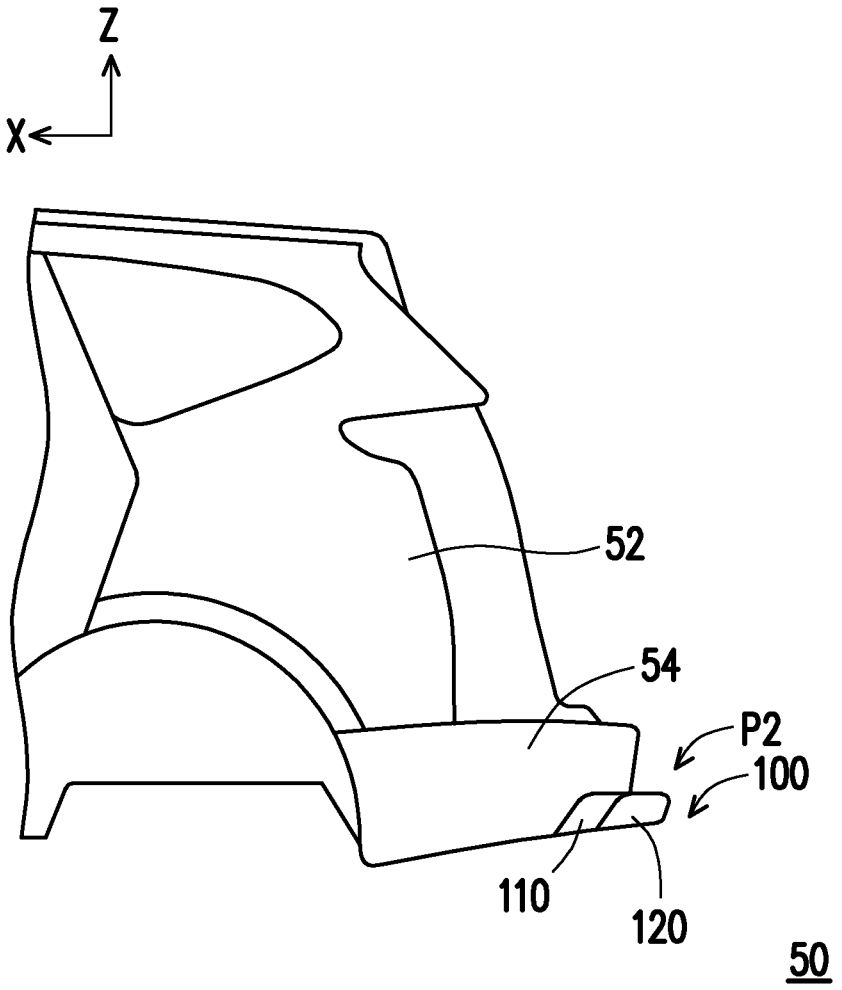
Figure 2A:
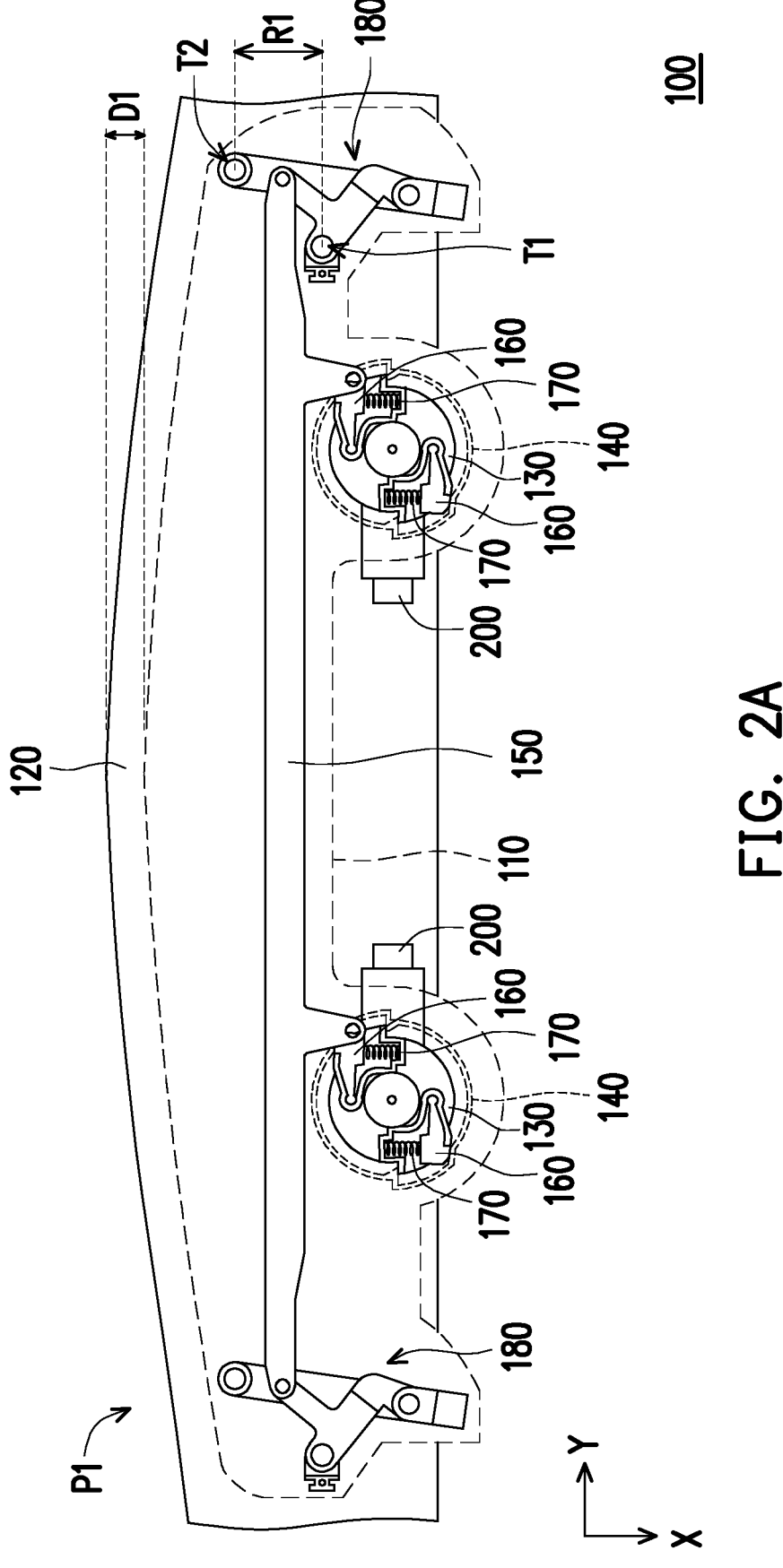
FIG. 2A and FIG. 2B are top schematic diagrams of the movable spoiler device shown in FIG. 1A and FIG. 1B at the storage position and the deployed position.
Figure 2B:
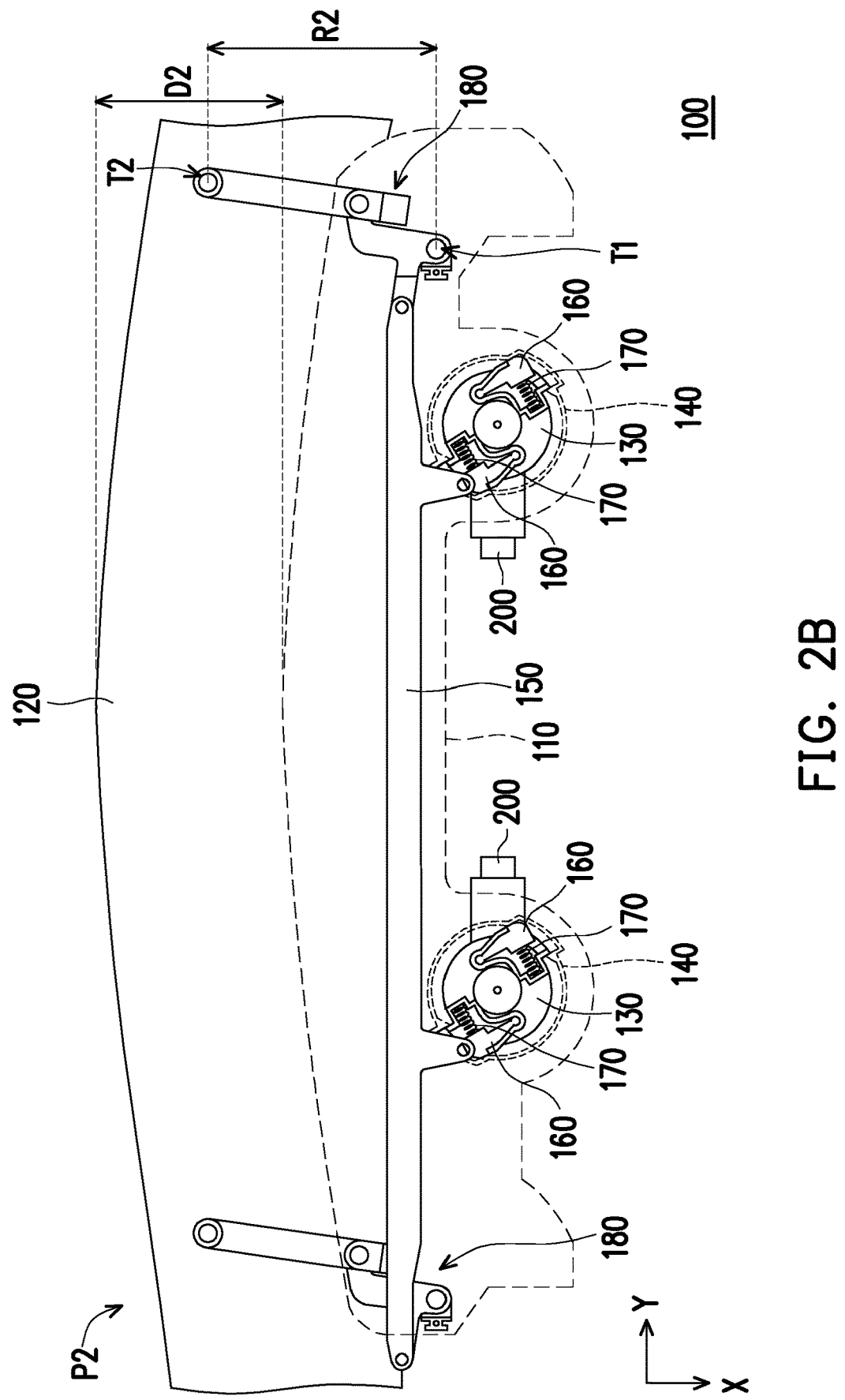
Figure 3A:
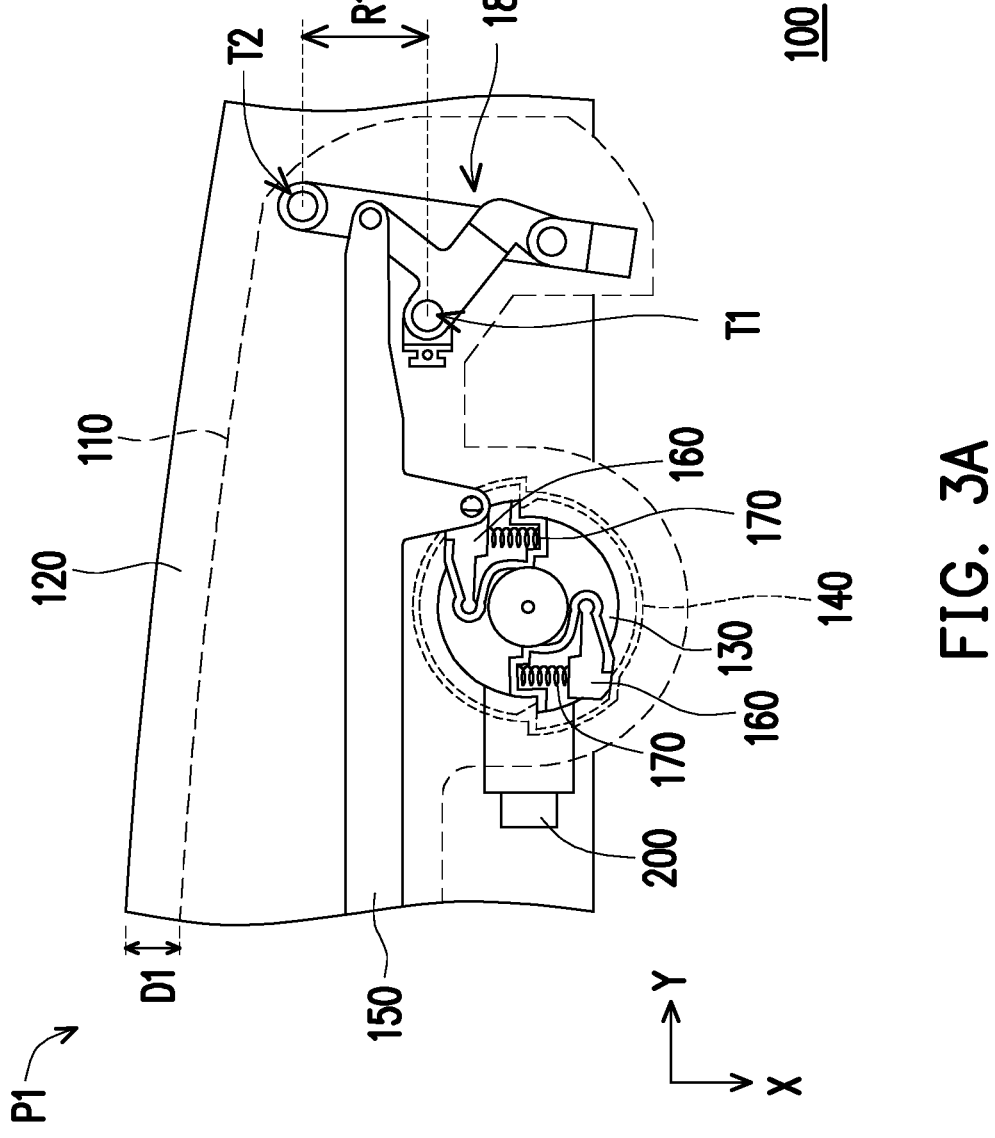
FIG. 3A and FIG. 3B are partially enlarged schematic diagrams of the movable spoiler device shown in FIG. 2A and FIG. 2B at the storage position and the deployed position.
Figure 3B:
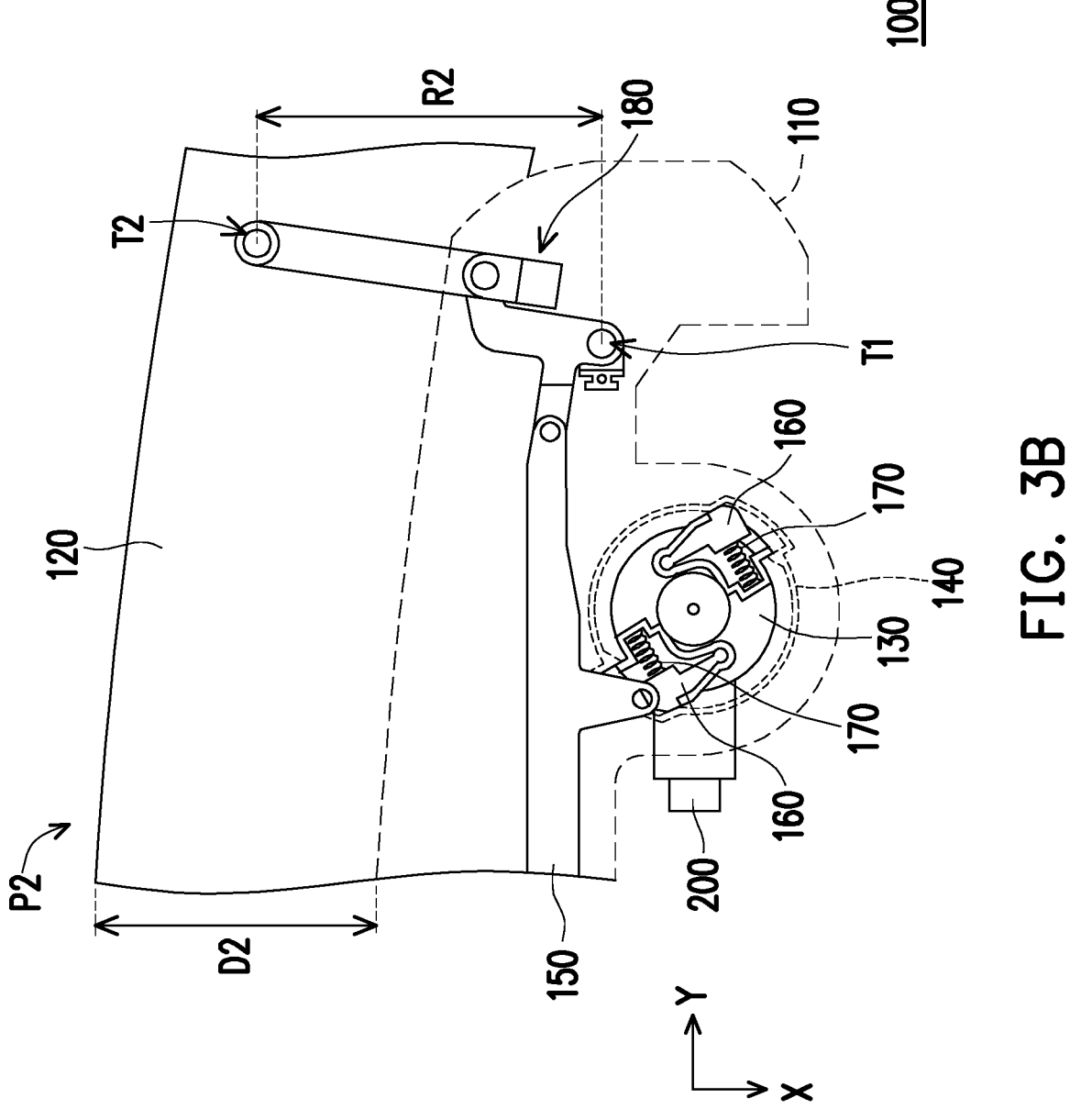
Figure 4:
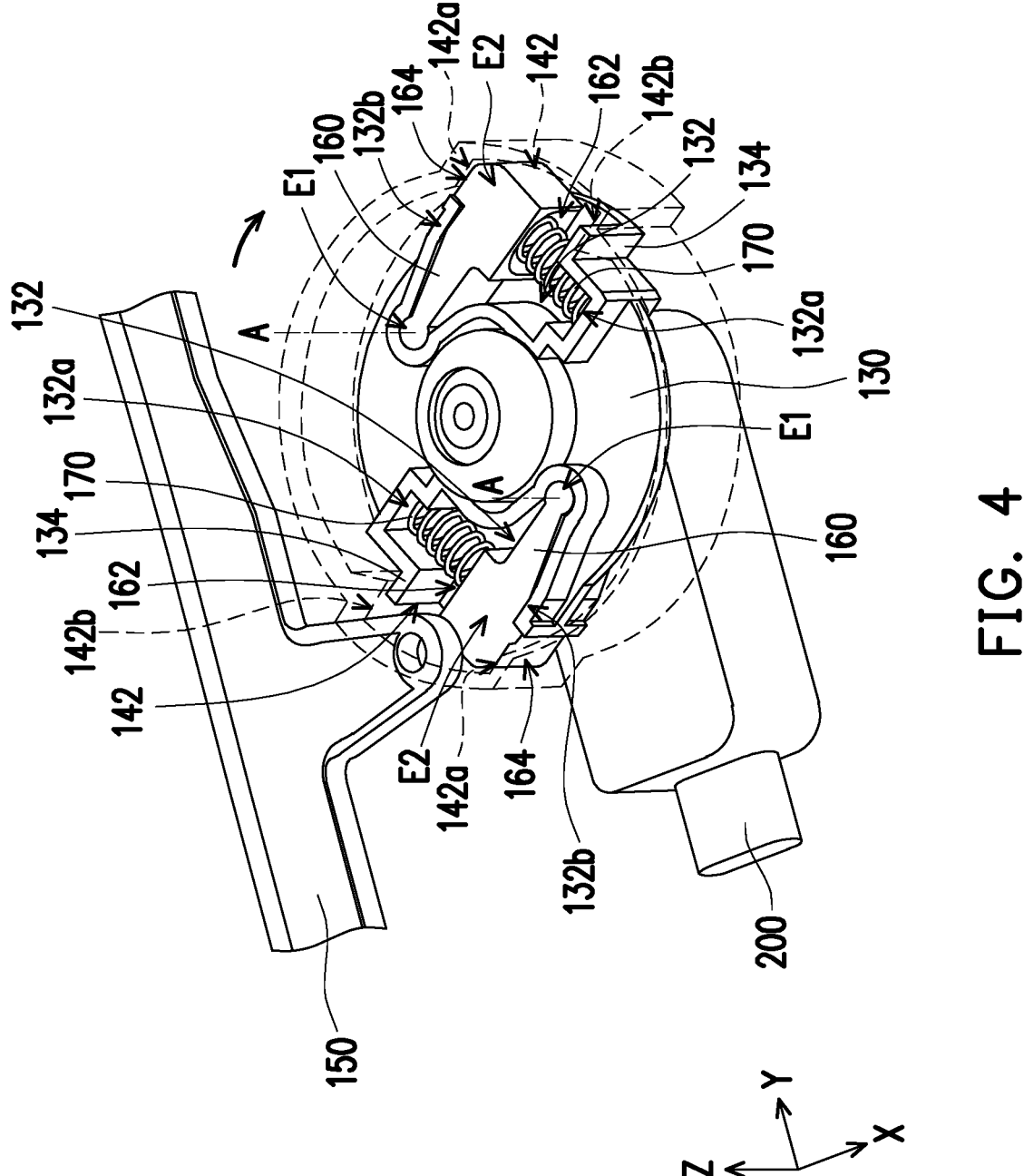
FIG. 4 is an appearance schematic diagram of internal components such as an actuator, a rotating frame, a connecting member, a locking member, and an elastic member used in the movable spoiler device shown in FIG. 2A and FIG. 2B.
Figure 5:
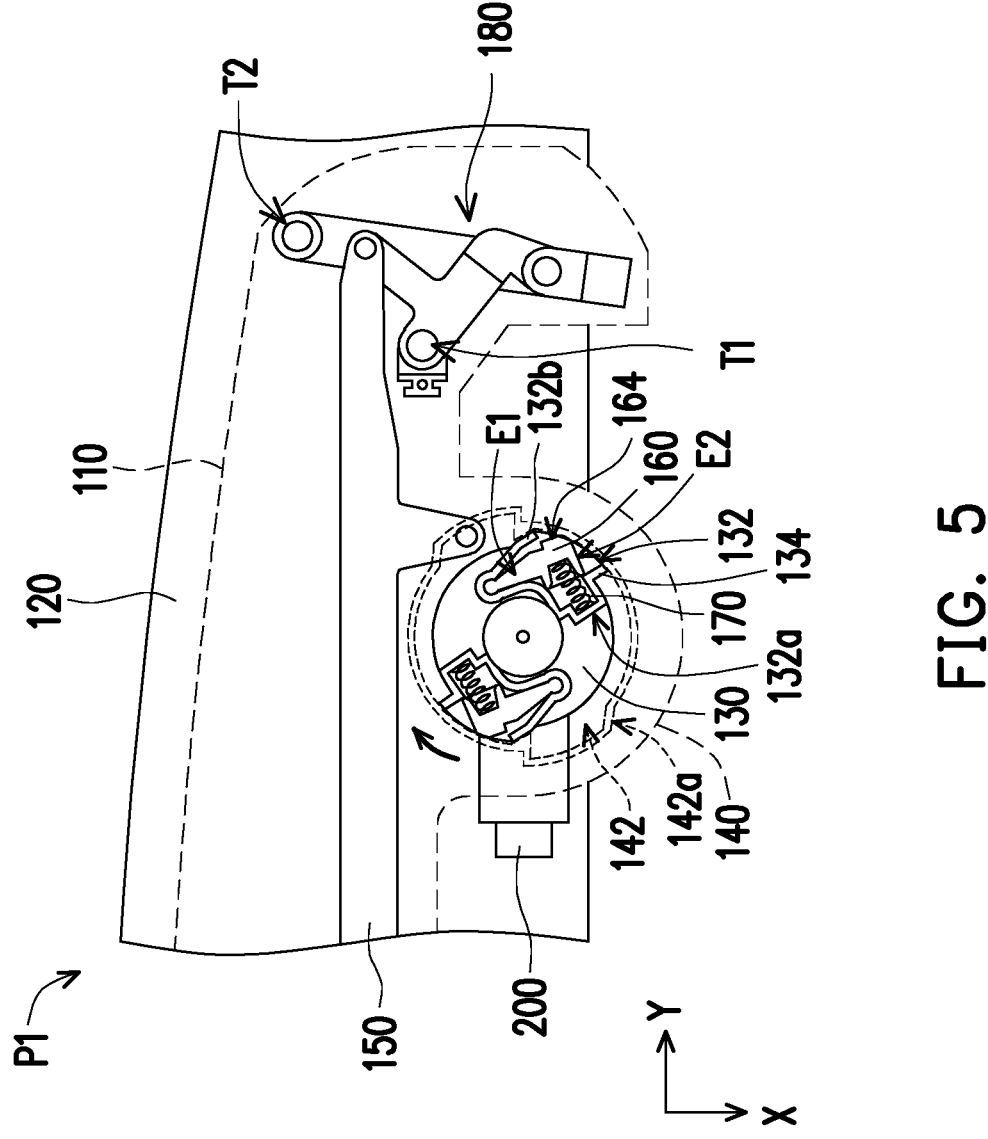
FIG. 5 is a partially enlarged schematic diagram of the movable spoiler device shown in FIG. 3B when it is in a deployed position and is subjected to a load applied toward the front.

References of the exemplary embodiments of the disclosure are to be made in detail. Examples of the exemplary embodiments are illustrated in the drawings. FIG. 1A and FIG. 1B are schematic diagrams of a movable spoiler device in an embodiment of the disclosure applied on a vehicle and is located in a storage position and a deployed position. FIG. 2A and FIG. 2B are top schematic diagrams of the movable spoiler device shown in FIG. 1A and FIG. 1B at the storage position and the deployed position. FIG. 3A and FIG. 3B are partially enlarged schematic diagrams of the movable spoiler device shown in FIG. 2A and FIG. 2B at the storage position and the deployed position. FIG. 4 is an appearance schematic diagram of internal components such as an actuator, a rotating frame, a connecting member, a locking member, and an elastic member used in the movable spoiler device shown in FIG. 2A and FIG. 2B. FIG. 5 is a partially enlarged schematic diagram of the movable spoiler device shown in FIG. 3B when it is in a deployed position and is subjected to a load applied toward the front. The application and specific structure of the movable spoiler device 100 of this embodiment is described below with reference to FIG. 1A to FIG. 5. The front-rear direction of the vehicle described later refers to, for example, the front-rear direction X in the accompanying drawings, and the direction indicated by the arrow is the front. The left-right direction of the vehicle refers to, for example, the left-right direction Y in the accompanying drawings, and the direction indicated by the arrow is the left. The up-down direction serving as the first direction of the vehicle refers to, for example, the up-down direction Z in the accompanying drawings, and the direction indicated by the arrow is upward. This is only one example of the disclosure, and the disclosure is not limited thereto.

In an embodiment of the disclosure, the locking member includes a first end and a second end, the first end is rotatably supported by the actuator in an axial direction extending in a first direction of the vehicle, the second end is connected to the elastic member, and is locked to the rotating frame by force applied through the elastic member.

In an embodiment of the disclosure, the carrier part of the actuator is provided with an accommodating recess for accommodating the locking member and the elastic member, the elastic member is disposed between a first inner side wall of the accommodating recess and a first side surface of the locking member, a second side surface of the locking member abuts against a second inner side wall of the accommodating recess, and an end of the locking member corresponding to the second side surface is fitted into the rotating frame.

In an embodiment of the disclosure, the rotating frame is provided with a fitting recess, and the carrier part of the actuator is provided with an extension part extending into the fitting recess, so as to drive the rotating frame to rotate synchronously, and the end of the locking member corresponding to the second side surface is fitted into the fitting recess.

Referring to FIG. 1A and FIG. 1B, in this embodiment, the movable spoiler device 100 is adapted to be installed on the body 52 of the vehicle 50 as an exterior component, so as to stabilize the airflow flowing through the vehicle 50, thereby improving the aerodynamic performance. The movable spoiler device 100 is, for example, a long and narrow structure extending along the left-right direction Y (e.g., as shown in FIG. 2A and FIG. 2B), which is the second direction of the vehicle 50, across the left and right sides of the vehicle 50, and disposed on the rear bumper 54 at the rear end of the body 52. Furthermore, as in the state shown in FIG. 1A and FIG. 1B, the movable spoiler device 100 may move in the front-rear direction X of the vehicle 50, such as moving between a storage position P1 connected to the rear bumper 54 and a deployed position P2 protruding from the rear bumper 54 toward the rear (i.e., the direction opposite to the direction indicated by the arrow in the front-rear direction X) of the vehicle 50. However, in other embodiments not shown, the movable spoiler device 100 may be disposed on other parts of the body 52 of the vehicle 50, and the disclosure does not limit the application of the movable spoiler device 100 on the vehicle 50, which may be adjusted according to requirements.

Specifically, in this embodiment, as shown in FIG. 1A to FIG. 3B, the movable spoiler device 100 includes a fixed part 110, a movable part 120, a carrier part 130, a rotating frame 140, a connecting member 150, a locking member 160, an elastic member 170, and an actuator 200. The fixed part 110 is fixed to the body 52 of the vehicle 50 (e.g., fixed to the rear bumper 54 shown in FIG. 1A and FIG. 1B). The movable part 120 is configured to be movable between a storage position P1 connected to the fixed part 110 and a deployed position P2 protruding from the fixed part 110 toward the rear (i.e., the direction opposite to the direction indicated by the arrow in the front-rear direction X) of the vehicle 50. The actuator 200 is disposed on the fixed part 110 and drives the movable part 120 to move in the front-rear direction X of the vehicle. The carrier part 130 of the actuator 200 is integrated fitting with the actuator 200 and the rotating axis to rotate synchronously with the actuator 200. The rotating frame 140 is connected to the carrier part 130 of the actuator 200 and rotates synchronously with the carrier part 130 of the actuator 200. The connecting member 150 is connected to the rotating frame 140 and the movable part 120. The locking member 160 is disposed between the carrier part 130 of the actuator 200 and the rotating frame 140, applies force on the carrier part 130 of the actuator 200 through the elastic member 170, and is locked on the rotating frame 140. Moreover, the movable spoiler device 100 further includes a link mechanism 180 disposed between the fixed part 110 and the movable part 120 and is connected to the carrier part 130 of the actuator 200 via the connecting member 150 and the rotating frame 140, so as to be linked with the fixed part 110 and the movable part 120. In this way, the movable part 120 moves relative to the fixed part 110 in the front-rear direction X of the vehicle 50 via the driving of the carrier part 130 of the actuator 200 and the driving of the rotating frame 140, the connecting member 150, and the link mechanism 180, that is, it moves between the storage position P1 and the deployed position P2.

As an example, in this embodiment, the fixed part 110 and the movable part 120 are each formed into a plate-like structure (not limited to a single plate, but also a combination of multiple plates) and connected to each other. The link mechanism 180 is disposed between the fixed part 110 and the movable part 120, and is connected to the rotating frame 140 provided at the outer side of the carrier part 130 of the actuator 200 via the connecting member 150, so as to contract or expand between the fixed part 110 and the movable part 120 via the driving of the actuator 200 and the linkage of the carrier part 130, the rotating frame 140, and the connecting member 150, thereby driving the movable part 120 to move in the front-rear direction X of the vehicle 50 relative to the fixed part 110. In addition, the carrier part 130 and the actuator 200 may also be integrally formed. Alternatively, the carrier part 130 may also be omitted. The specific structure and connection manner of the actuator 200 and the link mechanism 180 may be adjusted according to requirements, and the disclosure is not limited thereto.

The storage position P1 corresponds to the position shown in FIG. 1A, FIG. 2A, and FIG. 3A, the movable part 120 located at the storage position P1 is configured to be connected to the fixed part 110, and there is a relative distance D1 (as shown in FIG. 2A and FIG. 3A) between the outer ends of the fixed part 110 and the movable part 120. When the movable part 120 is located at the storage position P1 relative to the fixed part 110, the link mechanism 180 contracts, and the link mechanism 180 is connected to the first end point T1 of the fixed part 110, and the link mechanism 180 is connected to the second end point T2 the movable part 120, there is a vertical distance R1 between the first end point T1 and the second end point T2. Correspondingly, the deployed position P2 corresponds to the position shown in FIG. 1B, FIG. 2B, and FIG. 3B, the movable part 120 located at the deployed position P2 is configured to move further to the rear relative to the fixed part 110, and there is a relative distance D2 (as shown in FIG. 2B and FIG. 3B) between the outer ends of the fixed part 110 and the movable part 120. When the movable part 120 is located at the deployed position P2 relative to the fixed part 110, the link mechanism 180 expands, and there is a vertical distance R2 between the first end point T1 and the second end point T2 of the link mechanism 180.

It may be seen that, in this embodiment, the movable part 120 located at the deployed position P2 is further to the rear than the movable part 120 located at the storage position P1, so that the relative distance D2 when the movable part 120 is located at the deployed position P2 is greater than the relative distance D1 when the movable part 120 is located at the storage position P1. The vertical distance R2 of the link mechanism 180 that expands when it is located at the deployed position P2 is greater than the vertical distance R1 of the link mechanism 180 that contracts when it is located at the storage position P1. Therefore, the movable spoiler device 100 may adjust the position of the movable part 120 relative to the fixed part 110 via the driving of the actuator 200 according to the requirement, so as to adjust the airflow flowing through the vehicle 50 and improve the aerodynamic performance according to the requirement. However, the disclosure does not limit the relative distances D1 and D2, and the vertical distances R1 and R2, etc., between movable part 120 and the fixed part 110 at the storage position P1 and the deployed position P2, which may be adjusted according to requirements.

Furthermore, in this embodiment, as shown in FIG. 2A and FIG. 2B, a pair of link mechanisms 180 are provided on opposite sides of the vehicle 50 in the left-right direction Y. A pair of actuators 200 connects the pair of link mechanisms 180 via the connecting member 150 to drive the pair of link mechanisms 180 to contract or expand between the fixed part 110 and the movable part 120 simultaneously, so that the movable part 120 moves in the front-rear direction X relative to the fixed part 110. The opposite ends of the connecting member 150 in the left-right direction Y are respectively connected to a pair of link mechanisms 180, and the inner part of the connecting member 150 in the left-right direction Y is connected to the actuator 200 (the connecting part may be adjusted according to the position of the actuator 200). The pair of link mechanisms 180 is disposed such that the movable part 120 may move more smoothly relative to the fixed part 110, the pair of actuators 200 is disposed such that it is easier to drive the link mechanisms 180, and the connecting member 150 is disposed such that the driving of the left and right sides are synchronized. However, in other embodiments not shown, only one actuator 200 may be provided, and a pair of link mechanisms 180 may be connected via a connecting member 150. Alternatively, a pair of connecting members 150 may also be provided, and each of the pair of actuators 200 is connected to the corresponding link mechanism 180 via the corresponding connecting member 150. A combination of one actuator 200 with a pair of link mechanisms 150 and a pair of fixed links 180 may also be adopted. The disclosure does not limit the number of the actuator 200, the link mechanism 180, and the connecting member 150, which may be adjusted according to requirements.

Furthermore, as shown in FIG. 2A to FIG. 4, in this embodiment, the rotating frame 140 is, for example, a housing structure (shown in dashed lines in the drawings to show the carrier part 130, the locking member 160, the elastic member 170, etc. located inside it) disposed outside the carrier part 130 of the actuator 200. The coupling member 150 driven by the actuator 200 is actually connected to the rotating frame 140 via the carrier part 130. Since the rotating frame 140 is connected to the carrier part 130 and rotates synchronously with the actuator 200, the rotating frame 140 may drive a pair of link mechanisms 180 to contract or expand between the fixed part 110 and the movable part 120 via the connecting member 150, so that the movable part 120 moves in the front-rear direction X relative to the fixed part 110. Furthermore, the locking member 160 and the elastic member 170 are provided between the rotating frame 140 and the carrier part 130 of the actuator 200, which may not only serve as a synchronous rotation mechanism of the rotating frame 140 and the carrier part 130 of the actuator 200, but also protect the actuator 200.

In detail, as shown in FIG. 4, in this embodiment, the locking member 160 includes a first end E1 and a second end E2. The first end E1 is rotatably supported on the carrier part 130 of the actuator 200 in the axial direction A extending in the up-down direction Z of the vehicle 50, the second end E2 is connected to the elastic member 170, and is locked to the carrier part 130 and the rotating frame 140 of the actuator 200 by the force applied through the elastic member 170. Furthermore, the carrier part 130 of the actuator 200 is provided with an accommodating recess 132 for accommodating the locking member 160 and the elastic member 170 (e.g., disposed at the outer side of the carrier part 130), the elastic member 170 is disposed between a first inner side wall 132a of the accommodating recess 132 and a first side surface 162 of the locking member 160, a second side surface 164 of the locking member 160 abuts against a second inner side wall 132b of the accommodating recess 132, and an end (i.e., the second end E2) of the locking member 160 corresponding to the second side surface 164 is fitted into the rotating frame 140. Moreover, the rotating frame 140 is provided with a fitting recess 142 (e.g., disposed at the inner side of the rotating frame 140), and the carrier part 130 of the actuator 200 is provided with an extension part 134 extending into the fitting recess 142 to drive the rotating frame 140 to rotate synchronously, and the end (i.e., the second end E2) of the locking member 160 corresponding to the second side surface 164 is fitted into the fitting recess 142. That is to say, the extension part 134 of the carrier part 130 and the second end E2 of the locking member 160 corresponding to the second side surface 164 respectively abut against the opposite inner side surfaces of the fitting recess 142 of the rotating frame 140, thus the rotating frame 140 is driven to rotate synchronously in both the clockwise direction and the counterclockwise direction of the carrier part 130, but the disclosure is not limited thereto.

Thus, as an example, when the movable part 120 is located at the storage position P1 as shown in FIG. 2A and FIG. 3A, driven by the actuator 200 (e.g., the actuator 200 rotates counterclockwise), the rotating frame 140 and the carrier part 130 rotate synchronously (for example, the rotating frame 140 and the carrier part 130 also rotate counterclockwise), and drive the connecting member 150 to move in the left-right direction Y (e.g., the direction opposite to the direction indicated by the arrow in the left-right direction Y, which is moving to the left), so that the link mechanism 180 disposed between the fixed part 110 and the movable part 120 changes from the contracted state to the expanded state, thereby driving the movable part 120 to move relative to the fixed part 110 to the deployed position P2 as shown in FIG. 2B and FIG. 3B. During this process, the locking member 160 and the elastic member 170 accommodated in the accommodating recess 132 move in the same direction along with the carrier part 130 of the actuator 200, so that the rotation of the carrier part 130 of the actuator 200 pushes the first inner side surface 142a of the fitting recess 142 through the second end E2 of the locking member 160 corresponding to the second side surface 164 to drive the rotating frame 140 to also rotate synchronously in the same direction. Since there is no relative displacement between the rotating frame 140 and the carrier part 130 of the actuator 200 rotating synchronously, the locking member 160 and the elastic member 170 are preferably maintained in their original state in the accommodating recess 132, that is, the elastic member 170 continuously applies force on the locking member 160, so that the locking member 160 is locked to the carrier part 130 and the rotating frame 140 of the actuator 200.

Correspondingly, when the movable part 120 is located at the deployed position P2 as shown in FIG. 2B and FIG. 3B, driven by the actuator 200 (e.g., the actuator 200 rotates clockwise), the rotating frame 140 and the carrier part 130 rotate synchronously (for example, the rotating frame 140 and the carrier part 130 also rotate clockwise), and drive the connecting member 150 to move in the left-right direction Y (e.g., the direction indicated by the arrow in the left-right direction Y, which is moving to the right), so that the link mechanism 180 disposed between the fixed part 110 and the movable part 120 changes from the expanded state to the contracted state, thereby driving the movable part 120 to move relative to the fixed part 110 to the storage position P1 as shown in FIG. 2A and FIG. 3A. During this process, the rotation of the carrier part 130 of the actuator 200 pushes the second inner side surface 142b of the fitting recess 142 through the extension part 134 extending into the fitting recess 142 to drive the rotating frame 140 to also rotate synchronously in the same direction. Since there is no relative displacement between the rotating frame 140 and the carrier part 130 of the actuator 200 rotating synchronously, the locking member 160 and the elastic member 170 are preferably maintained in their original state in the accommodating recess 132, that is, the elastic member 170 continuously applies force on the locking member 160, so that the locking member 160 is locked to the carrier part 130 and the rotating frame 140 of the actuator 200. Therefore, the locking member 160 and the elastic member 170 are provided between the rotating frame 140 and the carrier part 130 of the actuator 200, which may serve as a synchronous rotation mechanism of the rotating frame 140 and the carrier part 130 of the actuator 200. However, the rotation direction of the actuator 200, the carrier part 130, the rotating frame 140, the moving direction of the connecting member 150, and the locking means of the locking member 160 may be adjusted according to requirements, and the disclosure is not limited thereto.

In addition, in this embodiment, although it is assumed that when the actuator 200 is driven by the spontaneous activation of the actuator 200, the movable part 120 moves relative to the fixed part 110 via the linkage of the rotating frame 140, the connecting member 150, and the link mechanism 180, etc., it is also assumed that when the actuator 200 is not activated spontaneously, but the movable part 120 at the deployed position P2 moves forward due to the application of an external load, the movement of the movable part 120 is also linked to the rotating frame 140 via the link mechanism 180, the connection member 150, etc. In view of this, the movable spoiler device 100 of this embodiment is provided with a locking member 160 and an elastic member 170 between the rotating frame 140 and the carrier part 130 of the actuator 200. When the movable part 120 is located at the deployed position P2 shown in FIG. 2B and FIG. 3B and is subjected to a load applied from the rear to the front of the vehicle 50, the rotating frame 140 is rotated by pushing the locking member 160 against the elastic member 170 to release the fitting of the locking member 160, and rotates idly relative to the carrier part 130 of the actuator 200.

It may be seen that, as an example, when the movable part 120 is located at the deployed position P2 shown in FIG. 2B and FIG. 3B relative to the fixed part 110 and is subjected to a load applied from the rear to the front of the vehicle 50, the movable part 120 moves relative to the fixed part 110 to the storage position P1 shown in FIG. 2A and FIG. 3A via an external load, drives the link mechanism 180 to change into a contracted state, and drives the connecting member 150 to move in the left-right direction Y (e.g., to move to the right), thereby driving the rotating frame 140 to rotate (e.g., the rotating frame 140 rotates clockwise). During this process, as shown in FIG. 4, along the clockwise direction indicated by the arrow, the first inner side surface 142a of the fitting recess 142 pushes the second end E2 of the locking member 160 corresponding to the second side 164, so that the locking member 160 rotates along the axial direction A with the first end E1 (e.g., the locking member 160 rotates clockwise), and pushes against the force applied through the elastic member 170 (e.g., the elastic member 170 is compressed). Moreover, after the locking member 160 has been pushed to the first inner side wall 132a of the accommodating recess 132 by the first inner side surface 142a of the fitting recess 142 and the elastic member 170 has been compressed to a minimum, as shown in FIG. 5, the first inner side surface 142a of the fitting recess 142 goes beyond the extension part 134 of the carrier part 130 of the actuator 200 to leave the area corresponding to the receiving recess 132 (i.e., leaving the locking member 160), so as to release the fitting of the locking member 160, so that the rotating frame 140 may continue to rotate idly relative to the carrier part 130 of the actuator 200 until the movable part 120 moves to the storage position P1.

Furthermore, in this embodiment, although the movable part 120 that moves from the deployment position P2 to the storage position P1 through an external load drives the link mechanism 180, the connecting member 150, and the rotating frame 140 to rotate or move to the state corresponding to the storage position P1 as shown in FIG. 2A and FIG. 3A, the rotation of the rotating frame 140 only drives the locking member 160 to push against the elastic member 170 without driving the carrier part 130. In particular, the rotation of the rotating frame 140 drives the locking member 160 to push against the elastic member 170 so as to release the fitting to the carrier part 130 and the rotating frame 140, so that the rotating frame 140 rotates idly relative to the carrier part 130, and such unintended rotation is not linked to the actuator 200 (i.e., the carrier part 130 may still stay in the state corresponding to the deployed position P2 as shown in FIG. 2B and FIG. 3B). In this way, the locking member 160 and the elastic member 170 are provided between the rotating frame 140 and the carrier part 130 of the actuator 200 to protect the actuator 200. Subsequently, the actuator 200 may be activated spontaneously according to the requirements to rotate the carrier part 130 to the state corresponding to the storage position P1 as shown in FIG. 2A and FIG. 3A, or the movable part 120 may be moved to the deployed position P2 as shown in FIG. 2B and FIG. 3B via an external load according to requirements, so that the link mechanism 180, the connecting member 150, and the rotating frame 140 are rotated or moved to a state corresponding to the deployed position P2 as shown in FIG. 2B and FIG. 3B. The locking member 160 may be locked to the rotating frame 140 again so that the rotating frame 140 is linked with the carrier part 130 of the actuator 200 again.

It may be seen that, in the movable spoiler device 100, when the actuator 200 is activated spontaneously to drive the movable part 120 (i.e., under normal operation), the locking member 160 and the elastic member 170 may serve as a synchronous rotation mechanism of the rotating frame 140 and the actuator 200, so that the carrier part 130 and the rotating frame 140 of the actuator 200 may drive the movable part 120 to move between the storage position P1 and the deployed position P2 relative to the fixed part 110 via the connecting member 150 and the link mechanism 180. Correspondingly, when the actuator 200 is not activated spontaneously and the movable part 120 at the deployed position P2 is moved toward the front to the storage position P1 via an application of an external load (i.e., under an unintended operation), the locking member 160 and the elastic member 170 may serve as a protection mechanism for the actuator 200. When the movable part 120 moves to the storage position P1 relative to the fixed part 110 and drives the rotating frame 140 through the connecting member 150 and the link mechanism 180, the synchronous rotation function of the rotating frame 140 and the carrier part 130 of the actuator 200 is released. In this way, even if the movable part 120 is pushed in reverse due to the application of an external load during the movement of the movable part 120 relative to the fixed part 110, the rotating frame 140 that rotates synchronously with the carrier part 130 through the fitting of the locking member 160 may also rotate idly relative to carrier part 130 of the actuator 200 in a state where the fitting of the locking member 160 is released, so that the rotation of the rotating frame 140 does not drive the actuator 200 and cause damage to it. Accordingly, the movable spoiler device 100 may prevent the actuator 200 from being damaged. However, the specific structure, connection manner, and operation means of the locking member 160 and the elastic member 170 may be adjusted according to requirements, and the disclosure is not limited thereto.

To sum up, in the movable spoiler device of the disclosure, the rotating frame and the carrier part of the actuator rotate synchronously, the connecting member is connected to the rotating frame and the movable part, and the locking member is disposed between the carrier part of the actuator and the rotating frame, applies force to the carrier part of the actuator through the elastic member, and is locked on the rotating frame. When the movable part is in the deployed position and is subjected to a load applied from the rear to front of the vehicle, the rotating frame is rotated by pushing the locking member against the elastic member to release the fitting of the locking member, and rotates idly relative to carrier part of the actuator. Preferably, the carrier part of the actuator is provided with an accommodating recess for accommodating the locking member and the elastic member, the elastic member is disposed between a first inner side wall of the accommodating recess and a first side surface of the locking member, a second side surface of the locking member abuts against a second inner side wall of the accommodating recess, and an end of the locking member corresponding to the second side surface is fitted into the rotating frame. In this way, even if the movable part is pushed in reverse due to the application of an external load during the movement of the movable part relative to the fixed part, the rotating frame that rotates synchronously with the carrier part of the actuator through the fitting of the locking member may also rotate idly relative to the carrier part of the actuator in a state where the fitting of the locking member is released, so that the rotation of the rotating frame does not drive the actuator through the carrier part and cause damage. Accordingly, the movable spoiler device of the disclosure may prevent the actuator from being damaged.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A movable spoiler device, comprising:
a fixed part, fixed on a body of a vehicle;
a movable part, configured to be movable between a storage position connected to the fixed part and a deployed position protruding from the fixed part toward rear of the vehicle;
an actuator, disposed on the fixed part and driving the movable part to move in a front-rear direction of the vehicle;
a rotating frame, connected to the actuator and rotating synchronously with the actuator;
a connecting member, connected to the rotating frame and the movable part; and
a locking member, disposed between the actuator and the rotating frame, applying force to the actuator through an elastic member, and locked on the rotating frame, wherein
when the movable part is in the deployed position and is subjected to a load applied from the rear toward front of the vehicle, the rotating frame is rotated by pushing the locking member against the elastic member to release fitting of the locking member, and rotates idly relative to the actuator.

2. The movable spoiler device according to claim 1, wherein
the locking member comprises a first end and a second end,
the first end is rotatably supported by the actuator in an axial direction extending in a first direction of the vehicle, the second end is connected to the elastic member, and is locked to the rotating frame by force applied through the elastic member.

3. The movable spoiler device according to claim 1, wherein
the carrier part of the actuator is provided with an accommodating recess for accommodating the locking member and the elastic member,
the elastic member is disposed between a first inner side wall of the accommodating recess and a first side surface of the locking member, a second side surface of the locking member abuts against a second inner side wall of the accommodating recess, and an end of the locking member corresponding to the second side sur-
face is fitted into the rotating frame.

4. The movable spoiler device according to claim 2,
wherein the carrier part of the actuator is provided with an accom-
modating recess for accommodating the locking mem-
ber and the elastic member, the elastic member is disposed between a first inner side
wall of the accommodating recess and a first side
surface of the locking member, a second side surface of
the locking member abuts against a second inner side
wall of the accommodating recess, and an end of the
locking member corresponding to the second side sur-
face is fitted into the rotating frame.

5. The movable spoiler device according to claim 3,
wherein the rotating frame is provided with a fitting recess, the carrier part of the actuator is provided with an exten-
sion part extending into the fitting recess, so as to drive
the rotating frame to rotate synchronously, and the end of the locking member corresponding to the
second side surface is fitted into the fitting recess.

6. The movable spoiler device according to claim 4,
wherein the rotating frame is provided with a fitting recess, the carrier part of the actuator is provided with an exten-
sion part extending into the fitting recess, so as to drive
the rotating frame to rotate synchronously, and the end of the locking member corresponding to the
second side surface is fitted into the fitting recess.

* * * * *